United States Patent [19]

Ohnishi et al.

[11] Patent Number: 4,957,689
[45] Date of Patent: Sep. 18, 1990

[54] SCANNING AND PRINTING APPARATUS

[75] Inventors: Masaru Ohnishi; Masashi Tamura, both of Kamakura, Japan

[73] Assignee: Mitsubishi Denki Kabushiki Kaisha, Tokyo, Japan

[21] Appl. No.: 422,690

[22] Filed: Oct. 17, 1989

[30] Foreign Application Priority Data

| Oct. 24, 1988 | [JP] | Japan | 63-267355 |
| Nov. 7, 1988 | [JP] | Japan | 63-280591 |
| Mar. 9, 1989 | [JP] | Japan | 64-54911 |

[51] Int. Cl.$^5$ .................... H04N 1/23; H04N 1/10;
                                    H04N 1/032; G01D 15/28
[52] U.S. Cl. ................................ 358/296; 358/401;
                                    358/476; 358/497; 346/134
[58] Field of Search ............ 358/296, 476, 472, 497,
                        358/401; 346/136, 134, 76 PH; 355/233, 235

[56] References Cited

U.S. PATENT DOCUMENTS

| 4,476,496 | 10/1984 | Thaler | 358/476 |
| 4,708,486 | 11/1987 | Watanabe | 358/497 |
| 4,829,320 | 5/1989 | Une | 346/76 PH |

FOREIGN PATENT DOCUMENTS

| 13574 | 1/1985 | Japan. |
| 75675 | 5/1987 | Japan. |

Primary Examiner—Bruce A. Reynolds
Assistant Examiner—Scott A. Rogers
Attorney, Agent, or Firm—Wolf, Greenfield & Sacks

[57] ABSTRACT

In a scanning and printing apparatus such as a copier or facsimile machine, the same driving system moves the scanning unit and transports paper through the printing unit. One edge of the paper is held by a clamping mechanism that is driven together with the scanning unit. In a copier, signals from the scanning unit can be sent directly to the printing unit for simultaneous scanning and printing, which automatically synchronizes the scanning and printing speeds. Alternatively, the signals can be temporarily stored, and scanning and printing can be performed in opposite directions of motion. For color scanning and printing, the scanning unit has filters that spectrally match the links in the printing unit. The apparatus is compact and economical because it has only a single driving mechanism and requires minimal signal interfacing.

20 Claims, 5 Drawing Sheets

SCANNING AND PRINTING APPARATUS

BACKGROUND OF THE INVENTION

This invention relates to a scanning and printing apparatus, such as a copier or facsimile machine, for flatbed scanning of documents and printing of document images.

A familiar example of such a scanning and printing apparatus is the electrophotographic copier in which a document is placed faced-down on a glass window called a copyboard, a cover is closed over the document, and the document is scanned by a movable scanning unit disposed below the copyboard. Traversing the document lengthwise, the scanning unit converts the image on the document to electrical signals which are sent to a printing unit comprising, for example, a rotating drum, a toner developing system, and a paper cassette. By extracting a sheet of paper from the cassette, transporting it under the drum, and transferring toner from the drum to the paper, the printing unit prints a black-and-white copy of the scanned image.

Color copiers comprising a thermal or ink-jet printing unit have also been developed. A typical color copier of this type scans a document three times, once for each of three primary colors, and transports the paper through the printing unit three times to have each color printed separately. Since the scanning speed is not in general equal to the printing speed, a buffer memory is needed to store the signals from the scanning unit before they are printed by the printing unit. It may further be necessary to process the signals sent from the scanning unit to the printing unit to compensate for differences between the spectral characteristics of the filters in the scanning unit and the inks in the printing unit.

A facsimile machine is similar in function, except that instead of sending electrical signals from its scanning unit to its printing unit, a facsimile machine sends signals from its scanning unit to a distant facsimile machine, and prints images received from a distant facsimile machine.

A problem of all these devices is their large size and high cost, which result from their complex internal structure. One cause of this problem is that the scanning unit and printing unit are independent, each having its own driving system. Many prior-art color copiers, for example, simply comprise a color scanner mounted atop a color thermal printer, the two units being completely separate except for the electrical interface between them.

In a copier, an associated problem is that to prevent distortion of the copied image, the speed of the driving system for the scanning unit must be accurately related to the speed of the driving system for paper transport in the printing unit. Expensive, high-precision stepping motors must therefore be used in these driving systems, and even so, distortion may occur due to vibration of the apparatus, or to motor irregularities.

SUMMARY OF THE INVENTION

An object of this invention is accordingly to simplify the structure of a scanning and printing apparatus.

Another object is to solve problems of synchronization of scanning and printing speeds.

A scanning and printing apparatus, for flatbed scanning of documents and printing of document images comprises driving means for generating a linear, reciprocal motion, scanning means coupled to and reciprocally moved by the driving means for scanning a document and converting an image thereof to electrical signals, clamping means coupled to and reciprocally moved by the driving means for holding one edge of a recording medium, thereby moving the recording medium in a reciprocal manner, and printing means for printing an image on the recording medium as the recording medium is moved by the clamping means.

DETAILED DESCRIPTION OF THE INVENTION

A novel scanning and printing apparatus for flatbed scanning of documents and printing of document images will be described with reference to FIGS. 1 to 5. The description will deal mainly with applications to copiers, but facsimile applications will also be briefly discussed.

Figure 1:
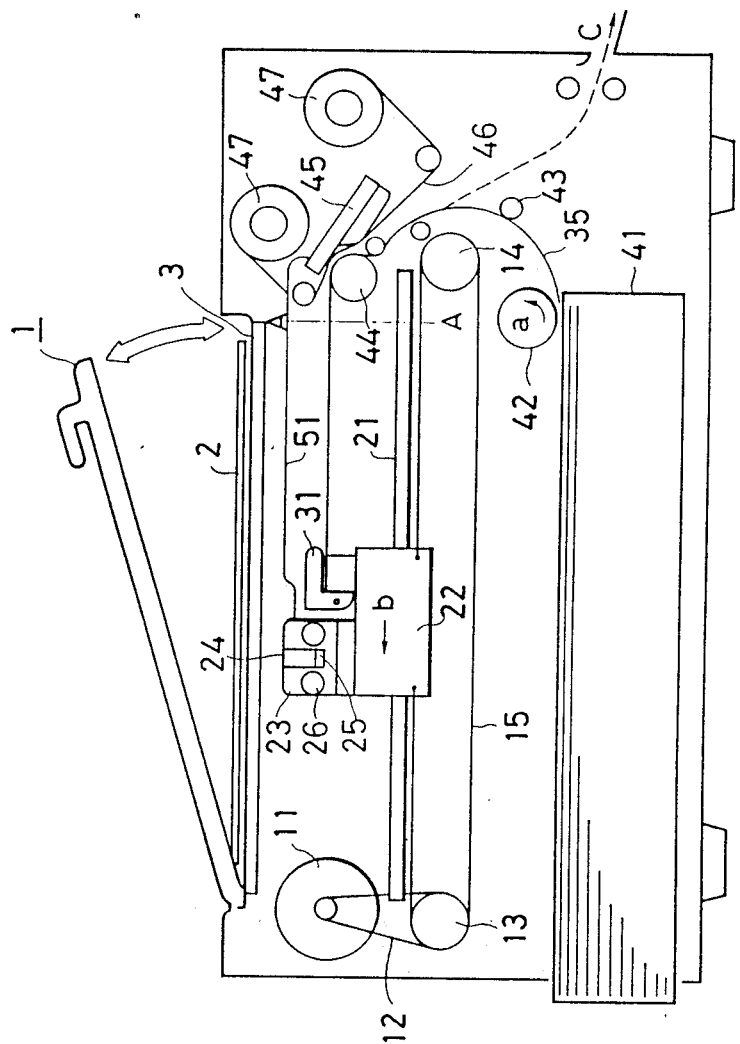
FIG. 1 is a sectional view of a monochrome scanning and printing apparatus.

The novel scanning and printing apparatus illustrated in FIG. 1 is a monochrome copier for making a black-and-white copy of a document. The apparatus has a cover 1 which can be opened to permit a document 2 to be placed face-down on a copyboard 3. The copyboard 3 is a sheet of transparent material such as glass.

Internally, the scanning and printing apparatus comprises a driving means, a scanning means, a clamping means, and a printing means.

The driving means in FIG. 1 comprises a motor 11, a belt 12, a first pulley 13, a second pulley 14, and a wire 15. The motor 11, which may be a stepping motor for example, is controlled so as to turn in first one direction, then the opposite direction. The motor 11 drives the belt 12 which turns the first pulley 13, thus generating a linear, reciprocating motion of the wire 15 which is strung on the first and second pulleys 13 and 14.

The scanning means is coupled to and reciprocally moved by the driving means so as to scan the document 2. In FIG. 1 the scanning means comprises a guide rail 21, a carriage 22, and a contact-type line sensor 23. The carriage 22 is movably mounted on the guide rail 21 and attached to the two ends of the wire 15. The contact-type line sensor 23 is rigidly mounted on the carriage 22. Thus as the motor 11 turns in first one direction then the other, the wire 15 pulls the carriage 22 back and forth along the guide rail 21, causing the contact-type line sensor 23 to scan the document 2 from beneath.

The contact-type line sensor 23 comprises, for example, a linear array of rod lenses 24 and photodetector elements 25. Light generated by light sources 26 is reflected from the document 2 and channeled by the rod lenses 24 to the photodetector elements 25, which generate electrical signals representative of the intensity of the received light. At a given position of the carriage 22, the photodetector elements 25 thus generate signals representing the intensity of a line of adjacent dot-shaped areas extending laterally across the document 2.

By moving lengthwise along the document 2, the contact-type line sensor 23 converts an image of the entire document 2 to electrical signals.

The clamping means is also coupled to and reciprocally moved by the driving means. In FIG. 1 the clamping means comprises a lever 31 attached to the carriage 22 and actuated by a well-known mechanism such as a spring and electromagnet, which are not shown in the drawing. The function of the lever 31 is to hold one edge of a recording medium 35 such as a sheet of paper, thereby moving the recording medium 35 in a reciprocal manner.

As the recording medium 35 is moved by the clamping means, the printing means prints an image on the recording medium 35. In FIG. 1 the printing means is a thermal printer comprising a cassette 41, a pick-up roller 42, one or more guide rollers 43, a platen roller 44, a thermal print head 45, an ink sheet 46, and a pair of reels 47. The cassette 41 accommodates one or more sheets of the recording medium 35. The pick-up roller 42 is disposed in contact with the top sheet of the recording medium 35, its function being to feed the recording medium 35 past the guide rollers 43 into the space between platen roller 44 and the thermal print head 45. The thermal print head 45 comprises a linear array of resistive heating elements. The ink sheet 46 is also fed into the space between the platen roller 44 and the thermal print head 45, the ink sheet 46 being disposed between the thermal print head 45 and the recording medium 35. The ink sheet 46 is wound on the reels 47, which turn so that the ink sheet 46 can move in contact with the recording medium 35. The ink sheet 46 is coated with ink that melts or sublimes when heated, thus being transferred to the recording medium 35.

Since the scanning and printing apparatus in FIG. 1 is a copier, it also comprises signal lines 51 for transmitting electrical signals from the scanning means to the printing means. More specifically, the signal lines 51 comprise lines coupling the photodetector elements 25 to circuits such as transistor circuits driving respective heating elements in the thermal print head 45.

Next the operation of the scanning and printing apparatus in FIG. 1 will be described.

Operation begins with the carriage 22 at the rightmost position in the drawing, even with the line marked A—A, and the lever 31 in a raised position. A document 2 is placed on the copyboard 3, the cover 1 is closed to shut out ambient light, and a control button not shown in the drawing is pressed. The pick-up roller 42 then begins turning in the direction of the arrow "a", feeding a sheet of recording medium 35 past the guide rollers 43 and between the platen roller 44 and the thermal print head 45. Feeding continues until the front edge of the recording medium 35 is under the lever 31. Then the pick-up roller 42 releases the recording medium 35 and the lever 31 is actuated to clamp the front edge of the recording medium 35 as shown in the drawing.

The motor 11 now begins to turn counterclockwise, moving the carriage 22 in the direction of the arrow "b" in the drawing, simultaneously moving the contact-type line sensor 23 beneath the document 2 and pulling the recording medium 35 past the thermal print head 45. At the same time the thermal print head 45 moves down to press the ink sheet 46 and the recording medium 35 against the platen roller 44, and the reels 47 turn to allow the ink sheet 46 to move together with the recording medium 35.

As the contact-type line sensor 23 moves beneath the document 2 it scans successive lines of dots, converting their intensity values to electrical signals as already explained. These electrical signals are transmitted via the signal lines 51 to the thermal print head 45, where they drive the transistor circuits for turning on and off the currents to the respective heating elements in the thermal print head 45.

Specifically, current is provided to the heating elements that correspond to dark dots in the line currently viewed by the contact-type line sensor 23, generating heat that transfers ink from the ink sheet 46 to the recording medium 35. Thus a pattern of dots is printed on the recording medium 35 matching the pattern viewed by the contact-type line sensor 23. As the carriage 22 moves in the direction of the arrow "b" successive lines are scanned and printed in this way until an image of the entire document 2 has been printed on the recording medium 35.

The motor 11 now reverses direction and drives the carriage 22 in the opposite direction back toward its starting position at A—A. The platen roller 44 also reverses direction, so that the recording medium 35 moves to the right in the drawing without buckling. The natural stiffness of the recording medium 35 causes it to feed out in the direction of the arrow "c" in the drawing. During this reverse motion the thermal print head 45 and the ink sheet 46 are raised so that they do not press against the recording medium 35.

When the carriage 22 has returned to the position A—A, the lever 31 releases the recording medium 35. The platen roller 44 and other rollers continue turning to deliver the recording medium 35 into a tray, for example, disposed to the right of the arrow "c," not shown in the drawing.

An advantage of the scanning and printing apparatus in FIG. 1 is that the same driving means moves both the contact-type line sensor 23 and the recording medium 35. The apparatus is thus more compact and economical than prior-art apparatus, requiring fewer motors, belts, pulleys, and wires.

An associated advantage is that the motion of the recording medium 35 during printing is automatically synchronized with the motion of the contact-type line sensor 23 during scanning, so image distortion does not occur even in the presence of vibration, or if the motor 11 does not operate with perfect regularity. It is accordingly not necessary for the motor 11 to be a stepping motor; a less expensive direct-current or alternating-current induction motor can be used.

Another advantage is that, since the electrical signals from the contact-type line sensor 23 drive the thermal print head 45 directly, no buffer memory or other interface circuitry is needed.

Next a scanning and printing apparatus for scanning and printing color images will be described with reference to FIGS. 2 and 3. Structurally, this scanning and printing apparatus is identical to the apparatus in FIG. 1 except that it employs an image sensor 60 instead of a contact-type line sensor, and has a multicolor ink sheet 48.

Figure 2:
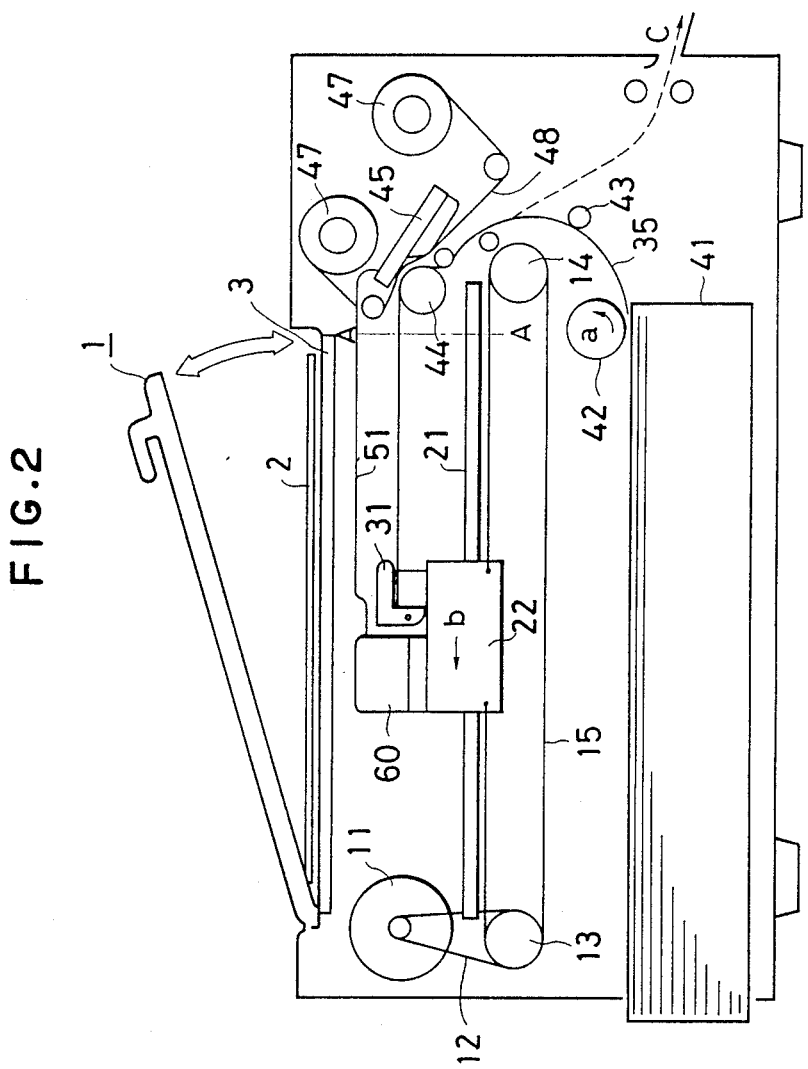
FIG. 2 is a sectional view of a color scanning and printing apparatus.
Figure 3:
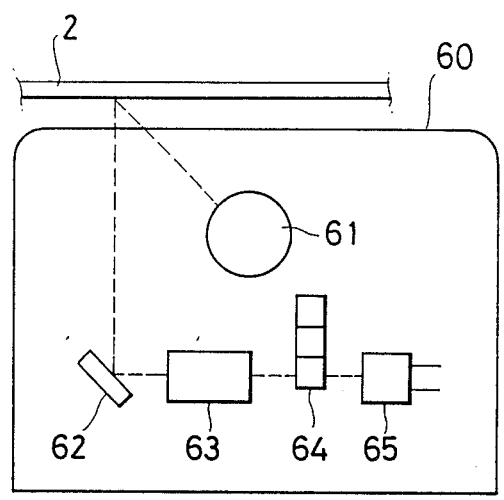
FIG. 3 is a more detailed, schematic view of the image sensor in FIG. 2.

The structure of the image sensor 60 in FIG. 2 is shown in greater detail in FIG. 3. The image sensor 60 comprises illumination means such as a fluorescent lamp 61, a mirror 62, reducing optical means such as a lens 63, color filters 64, and photodetector means such as an array of photodetector elements 65. Light emitted by the fluorescent lamp 61 is reflected from the underside of the document 2, reflected by the mirror 62, and focused by the lens 63 through the color filters 64 onto the photodetector elements 65. The color filters 64 transmit three different primary colors, such as yellow, magenta, and cyan, enabling these colors to be scanned separately.

The multicolor ink sheet 48 in FIG. 2 has inks of the same three primary colors disposed in separate areas sequentially arranged along the length of the ink sheet, the spectral reflectance characteristics of respective inks being substantially identical to the spectral transmittance characteristics of the color filters 64.

The operation of the scanning and printing apparatus in FIG. 2 is similar to the operation of the scanning and printing apparatus in FIG. 1 except that the document 2 is scanned three times, once per color.

In the first scan, the color filters 64 are positioned so that the light from the lens 63 passes through the yellow filter, and the multicolor ink sheet 48 is positioned so that a yellow area faces the recording medium 35. Thus as the carriage 22 moves in the direction of the arrow "b," an image of the yellow component of the document 2 is printed on the recording medium 35. When yellow scanning is complete, the motor 11 and platen roller 44 reverse and the reels 47 and multicolor ink sheet 48 move away from the platen roller 44 as before, but when the carriage 22 returns to the position A—A, the lever 31 does not release the recording medium 35.

Next the color filters 64 are repositioned so that the light from the lens 63 passes through the magenta filter, and the multicolor ink sheet 48 is repositioned (if necessary) so that a magenta area faces the recording medium 35. The motor 11 and platen roller 44 now reverse again to start the second scan. This scan is performed in exactly the same way as the first, printing an image of the magenta component of the document 2 on the recording medium 35, superimposed on the yellow image.

Finally, the color filters 64 are repositioned so that the light from the lens 63 passes through the cyan filter, the multicolor ink sheet 48 is repositioned (if necessary) so that a cyan area faces the recording medium 35, and a third scan is performed to print an image of the cyan component of the document 2 on the recording medium 35, superimposed on the yellow and magenta images. At the end of this scan, when the carriage 22 returns to the position A—A the lever 31 releases the recording medium 35 so that it can be fed out in the direction of the arrow "c." The superimposed images in the three primary colors combine to produce a full-color copy of the document 2 on the recording medium 35.

Matching of the spectral characteristics of the color filters 64 and the inks on the multicolor ink sheet 48 enables the signals from the image sensor 60 to drive the thermal print head 45 directly, without the need for compensating circuits as in the prior art.

Figure 4:
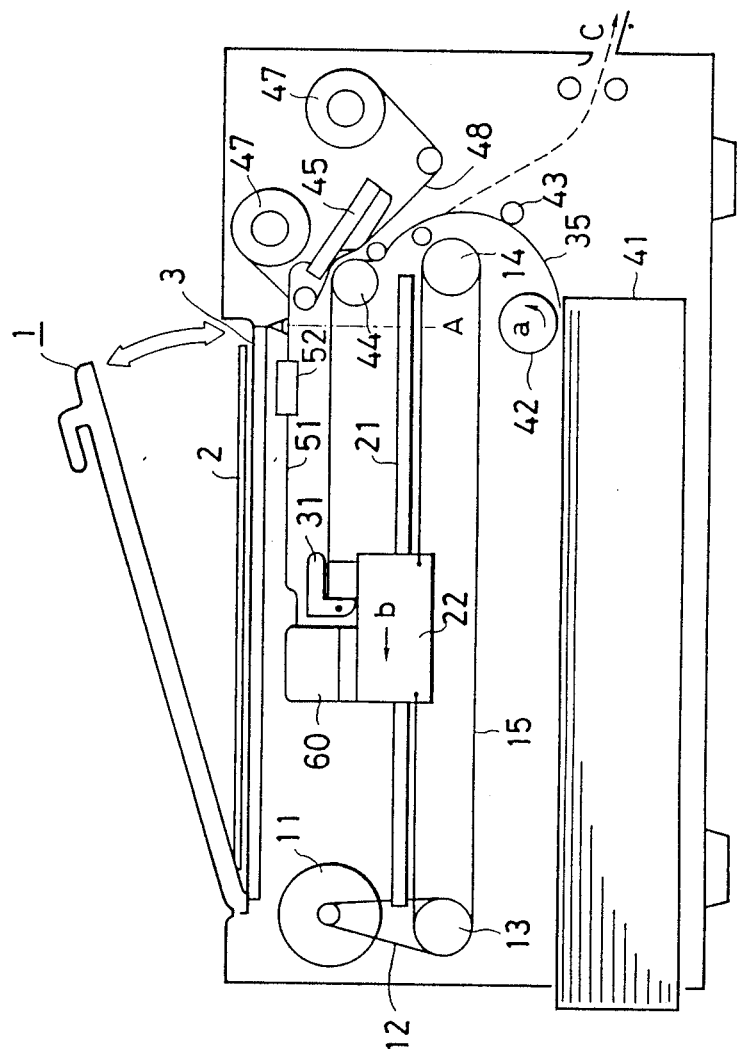
FIG. 4 is a sectional view of another color scanning and printing apparatus.

A variation of the scanning and printing apparatus in FIG. 2 will next be described with reference to FIG. 4. The scanning and printing apparatus in FIG. 4 is similar to the scanning and printing apparatus in FIG. 2, but also has a signal processing circuit 52 disposed on the signal lines 51 between the image sensor 60 and the thermal print head 45. The signal processing circuit 52 comprises a memory circuit for temporary storage of the electrical signals produced by the image sensor 60 before they are transmitted to the thermal print head 45. The operation of the scanning and printing apparatus in FIG. 4 is similar to the operation of the scanning and printing apparatus in FIG. 2 except that the document is scanned while the driving means drives the scanning and clamping means in one direction, and the corresponding color image is printed while the driving means drives the scanning and clamping means in the reverse direction.

In the yellow scan, for example, as the motor 11 drives the carriage 22 in the direction of the arrow "b," the thermal print head 45 and the multicolor ink sheet 48 are raised so that they do not contact the recording medium 35, and the signals representing the yellow component of the image are stored as data in the signal processing circuit 52. Then when motor 11 and the platen roller 44 reverse to move the recording medium 35 back to the right in the drawing, the thermal print head 45 and the multicolor ink sheet 48 are lowered and the signal data stored in the signal processing circuit 52 are read out in reverse order and sent to the thermal print head 45, causing it to print the yellow component of the image on the recording medium 35.

The magenta and cyan components are scanned and printed in the same way, producing a full-color copy of the document 2.

In addition to a memory circuit, the signal processing circuit 52 may comprise further circuits for processing the electrical signals transmitted from the scanning means to the printing means. Processes such as edge enhancement and intensity-scale adjustment can be performed, for example, or the image can be enlarged or reduced. Reduction and enlargement processes can be carried out entirely in the signal processing circuit 52 by combining or interpolating dots. Alternatively, the signal processing circuit 52 can perform enlargement and reduction in the lateral direction, leaving enlargement and reduction in the lengthwise direction to be performed by running the motor 11 and the platen roller 44 at a faster or slower speed in the reverse direction during printing than in the forward direction during scanning.

Next another scanning and printing apparatus will be described with reference to FIG. 5. This scanning and printing apparatus is similar to the one in FIG. 1 except for the structure of its driving and scanning means.

Figure 5:
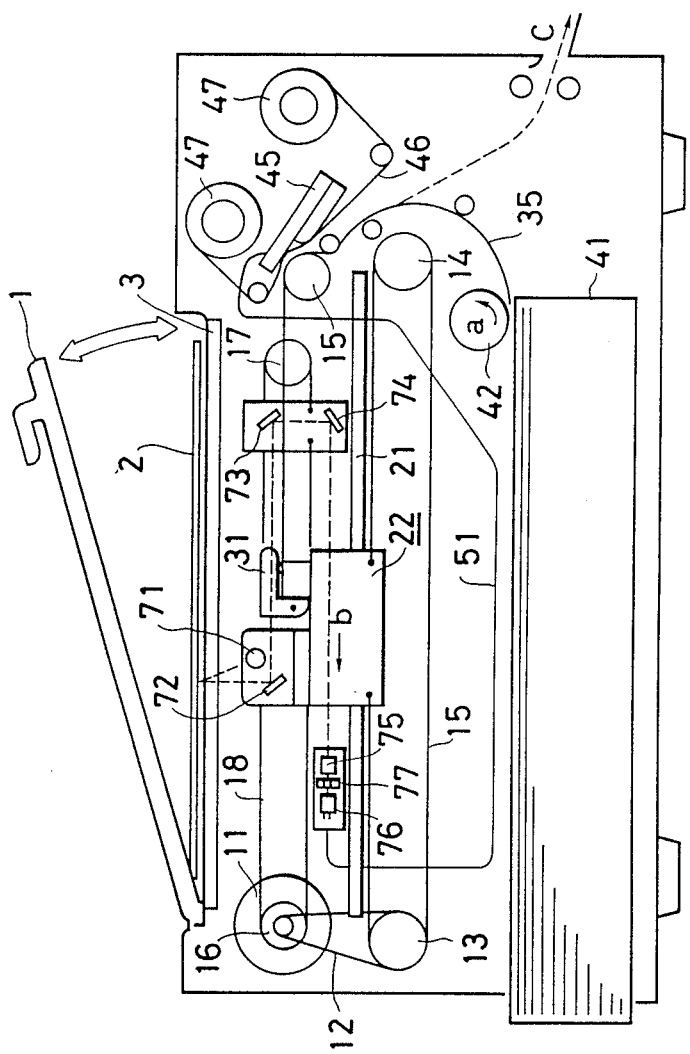
FIG. 5 is a sectional view of yet another color scanning and printing apparatus.

The driving means in FIG. 5 comprises a motor 11, a belt 12, a first pulley 13, a second pulley 14, and a wire 15 which are identical or equivalent to the elements with the same numbers in FIG. 1, and a third pulley 16, a fourth pulley 17, and a second wire 18. The relative sizes of the first and second pulleys 13 and 14 and the third and fourth pulleys 16 and 17 are such that the second wire 18 is driven at half the speed of the wire 15.

The optical system of the scanning means in FIG. 5 has three separate parts.

The first part comprises illumination means such as a fluorescent lamp 71 and a first mirror 72. These are mounted on the carriage 22 and driven by the wire 15 at the same speed as the clamping lever 31.

The second part comprises a second mirror 73 and a third mirror 74. These are coupled to the second wire 18 and driven in the same direction as the clamping lever 31 but at half the speed.

The third part is stationary and comprises reducing optical means such as a lens 75, and photodetector means such as an array of photodetector elements 76. It is this stationary part of the scanning means that is connected by the signal lines 51 to the thermal print head 45. Accordingly, it is not necessary for one end of the signal lines 51 to move together with the scanning motion of the carriage 22, as in FIGS. 1, 2, and 4.

Aside from the structural difference in the driving and scanning means, the scanning and printing apparatus in FIG. 5 operates like that in FIG. 1. Due to the relative speeds of the first and second parts of the scanning means, the length of the optical path from the document 2 to the array of photodetector elements 76 remains constant throughout the scan.

For scanning and printing of color images, color filters 77 may be inserted between the lens 75 and the photodetector elements 76.

Although the scanning and printing apparatus in FIGS. 1 to 5 have all been described as copiers, with a single modification the same structures can be used in facsimile apparatus. The modification is that instead of being connected to each other by signal lines 51, the scanning means and printing means are both connected through an interface unit to a communication line such as a telephone line. The interface unit comprises well-known circuits such as modulator and demodulator circuits and control circuits, enabling the scanning and printing apparatus to transmit images to and receive images from a distant facsimile machine.

In the transmit mode of operation, the carriage 22 moves to scan the document 2 and the electrical signals generated are sent over the communication line to the distant facsimile machine, while the entire printing means remains idle. The pick-up roller 42 does not feed the recording medium 35, the guide rollers 43, the platen roller 44, and the reels 47 do not turn, and power is not supplied to the thermal print head 45.

In the receive mode, the printing means is active. The cassette 41 feeds recording medium 35 to the lever 31, which clamps it and moves together with the carriage 22, transporting the recording medium 35 while the thermal print head 45 prints an image according to electrical signals received from the distant facsimile machine. The scanning means also moves, but the illumination means are not switched on and no electrical signals are generated.

The scope of this invention is not limited to the structures described in the drawings, but includes many modifications that will be apparent to one skilled in the art. For example, use of a contact-type line sensor for monochrome scanning and an image sensor for color scanning was described, but it is also possible to use an image sensor for monochrome scanning or, with a suitable arrangement of color filters and photodetector elements, to use a contact-type line scanner for color scanning. An example of the image sensor for use with the reducing optical system is a CCD image sensor.

In place of the combination of the color filters and the monochrome image sensor, a color line sensor having groups of photo-detector elements, each group of the sensors being sensitive to a particular color, e.g., one of the three primary colors may be used.

In color scanning and printing, the primary colors need not be yellow, magenta, and cyan, and the number of colors need not be three. For example, it is possible to use four colors such as yellow, magenta, cyan, and black, or two colors such as black and red.

The printing means may comprise an ink-jet or dot matrix print head instead of a thermal print head.

The clamping means need not be attached to the scanning means as shown in FIGS. 1, 2, 4, and 5. It can be attached to the wire 15 at a separate location.

Although only a single guide rail 21 was shown in FIGS. 1, 2, 4, and 5, the carriage 22 may be mounted on a pair of guide rails.

Printing and scanning sequences other than the ones described can be employed. In color copying, for example, the first color can be simultaneously scanned and printed as the scanning means moves in one direction; then the second color can be simultaneously scanned and printed as the scanning means returns in the opposite direction. Alternatively, to permit optimal alignment and signal processing, all scanning and printing operations can be performed separately and in the same direction, using two full reciprocating cycles for each color.

What is claimed is:

1. A scanning and printing apparatus for flatbed scanning of documents and printing of document images, comprising:

driving means for generating a linear, reciprocal motion:

scanning means, coupled to and reciprocally moved by said driving means, for scanning a document and converting an image thereof to electrical signals;

clamping means, coupled to and reciprocally moved by said driving means, for holding one edge of a recording medium, thereby moving said recording medium in a reciprocal manner; and printing means for printing an image on said recording medium as said recording medium is moved by said clamping means.

2. The scanning and printing apparatus of claim 1, further comprising signal lines for transmitting said electrical signals from said scanning means to said printing means, which prints an image of the document scanned by said scanning means.

3. The scanning and printing apparatus of claim 2, wherein said printing means comprises a thermal printer.

4. The scanning and printing apparatus of claim 3, wherein said thermal printer comprises an ink sheet with inks of different colors disposed in separate areas.

5. The scanning and printing apparatus of claim 4, wherein said scanning means comprises color filters for scanning different colors separately.

6. The scanning and printing apparatus of claim 5, wherein the spectral transmittance characteristics of said color filters are substantially identical to the spectral reflectance characteristics of respective inks in said thermal printer.

7. The scanning and printing apparatus of claim 6, wherein said thermal printer comprises thermal elements that are directly driven by said electrical signals transmitted from said scanning means to said printing means.

8. The scanning and printing apparatus of claim 5, wherein said scanning means scans said document once per color, the corresponding color image being printed simultaneously by said printing means.

9. The scanning and printing apparatus of claim 5, wherein said scanning means scans said document once per color, the document being scanned while said driving means drives said scanning means and said clamping means in one direction, and the corresponding color image being printed by said printing means while said driving means drives said scanning means and said clamping means in the reverse direction.

10. The scanning and printing apparatus of claim 2, further comprising a signal-processing circuit inserted between said scanning means and said printing means, for processing said electrical signals transmitted from said scanning means to said printing means.

11. The scanning and printing apparatus of claim 1, wherein said clamping means is attached to said scanning means.

12. The scanning and printing apparatus of claim 1, wherein said scanning means comprises a contact-type line sensor.

13. The scanning and printing apparatus of claim 1, wherein said scanning means comprises illumination means, a mirror, reducing optical means, and photodetector means.

14. The scanning and printing apparatus of claim 1, wherein said scanning means comprises:
   illumination means and a first mirror driven by said driving means at the same speed as said clamping means;
   a second and third mirror driven by said driving means at half the speed of said clamping means; and
   a stationary reducing optical system and stationary photodetector means.

15. A scanning and printing apparatus for flatbed scanning of documents and printing of document images on a recording medium, said apparatus comprising: means for scanning a document and converting an image thereon into an electrical signal, means for driving said scanning means with linear and reciprocal motion, clamping means coupled to an reciprocally moved by said driving means for holding the recording medium to thereby move the recording medium in a reciprocal manner, and printing means for printing an image on said recording medium as said recording medium is moved by said clamping means.

16. A scanning and printing apparatus as set forth in claim 15 wherein said clamping means holds one edge of the recording medium.

17. A method of scanning documents and printing document images on a recording medium, comprising the steps of;
   scanning the document and converting the document images to electrical signals,
   moving said recording medium in tandem with the scanning step,
   and printing an image on said recording medium under control of said electrical signals and as said recording medium is moved.

18. A method as set forth in claim 17 wherein the moving and scanning steps are performed in the same direction.

19. A method as set forth in claim 17 wherein the printing and scanning are performed in synchronism.

20. A method as set forth in claim 17 wherein the electrical signals are temporarily stored and the scanning and printing are performed in opposite directions of motion.

* * * * *